US012633195B2

(12) United States Patent
Ha et al.

(10) Patent No.: US 12,633,195 B2
(45) Date of Patent: May 19, 2026

(54) METHODS AND SYSTEMS FOR SECURITY OF GAMING MACHINE SHOW SOFTWARE

(71) Applicant: IGT, Las Vegas, NV (US)

(72) Inventors: Yan Ha, Reno, NV (US); Dwayne Nelson, Las Vegas, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 387 days.

(21) Appl. No.: 18/138,815

(22) Filed: Apr. 25, 2023

(65) Prior Publication Data

US 2024/0362972 A1 Oct. 31, 2024

(51) Int. Cl.
*G07F 17/32* (2006.01)

(52) U.S. Cl.
CPC ................................ *G07F 17/3241* (2013.01)

(58) Field of Classification Search
CPC .................................................. G07F 17/3241
See application file for complete search history.

(56) References Cited

U.S. PATENT DOCUMENTS 7,294,056 B2 * 11/2007 Lowell .................. G07F 17/329 463/17
8,147,334 B2 * 4/2012 Gatto .................. G07F 17/3244 463/40
8,337,294 B2 * 12/2012 Sharkov .................. G07F 17/32 463/16
8,764,566 B2 * 7/2014 Miltenberger ...... G07F 17/3232 463/40
2004/0254015 A1 * 12/2004 Nozaki ............... G07F 17/3211 463/31
2007/0054734 A1 * 3/2007 Morrow .................. G07F 17/32 463/29
2007/0054741 A1 * 3/2007 Morrow .............. G07F 17/3241 463/42
2007/0055753 A1 * 3/2007 Robb ...................... A63F 13/30 709/220
2008/0176638 A1 * 7/2008 Goodman ........... G07F 17/3232 463/25
2008/0220879 A1 * 9/2008 Barrie ..................... G07F 17/32 463/42
2008/0220880 A1 * 9/2008 Barrie ..................... G07F 17/32 463/42

(Continued)

*Primary Examiner* — Chase E Leichliter
(74) *Attorney, Agent, or Firm* — Sheridan Ross P.C.

(57) ABSTRACT

Embodiments of the present disclosure are directed to controlling access to a gaming system. According to one embodiment, controlling access to a gaming system can comprise initiating a start-up routine and reading, during the start-up routine, a pre-defined value stored in a memory of the gaming system. The pre-defined value can indicate a market in which the gaming system is to be operated. The market can comprise a commercial market or a non-commercial market. A determination can be made as to operate the gaming system in a commercial mode or a non-commercial mode based on the pre-defined value. In response to determining to operate the gaming system in the non-commercial mode operation of a feature or function of the gaming system can be modified. Modifying the operation of the feature or function of the gaming system can inhibit the gaming system from being used in an unauthorized commercial mode.

20 Claims, 4 Drawing Sheets

(56) References Cited

U.S. PATENT DOCUMENTS

| | | | | |
|---|---|---|---|---|
| 2008/0287183 | A1* | 11/2008 | Reeves, III | G07F 17/38 463/25 |
| 2010/0120526 | A1* | 5/2010 | Singh | G07F 17/32 463/29 |
| 2010/0120527 | A1* | 5/2010 | Singh | G07F 17/3241 463/29 |
| 2013/0281183 | A1* | 10/2013 | Borissov | G07F 17/3223 463/25 |
| 2014/0051497 | A1* | 2/2014 | Lang | G07F 17/3241 463/25 |
| 2015/0242618 | A1* | 8/2015 | Itskov | G07F 17/3225 726/4 |
| 2016/0089607 | A1* | 3/2016 | Ike | G07F 17/3211 463/29 |
| 2016/0110953 | A1* | 4/2016 | Sotiriou | G07F 17/3227 463/25 |
| 2017/0092069 | A1* | 3/2017 | Pececnik | G07F 17/3269 |
| 2020/0250919 | A1* | 8/2020 | Kwon | G06F 16/483 |
| 2024/0233479 | A1* | 7/2024 | Gupta | G07F 17/3244 |
| 2024/0362972 | A1* | 10/2024 | Ha | G07F 17/3241 |

* cited by examiner

METHODS AND SYSTEMS FOR SECURITY OF GAMING MACHINE SHOW SOFTWARE

BACKGROUND

The present disclosure is generally directed to security of a gaming machine or system and, in particular, toward preventing an unauthorized use of a gaming system in a commercial manner.

Gaming system producers typically provide show software for their gaming systems such as Electronic Gaming Machines (EGMs) and related products. This software allows sales personnel to quickly set up a demonstration version of the products for trade shows. In some cases, users of such gaming systems have been able to use this show software in a release environment, i.e., in a commercial manner, bypassing the purchasing of the software from the gaming system producer and skipping regulatory approvals. Hence there is a need in the art for improved methods and systems for preventing an unauthorized use of a gaming system in a commercial manner.

BRIEF SUMMARY

Embodiments of the present disclosure are directed to controlling access to a gaming system. According to one embodiment, a method for controlling access to a gaming system can comprise initiating a start-up routine and reading, during the start-up routine, a pre-defined value stored in a memory of the gaming system. The pre-defined value can indicate a market in which the gaming system is to be operated. The market can comprise one of a plurality of possible markets and the plurality of markets can comprise a commercial market and a non-commercial market. A determination can be made as to operate the gaming system in a commercial mode or a non-commercial mode based on the pre-defined value. In response to determining to operate the gaming system in the non-commercial mode operation of a feature or function of the gaming system can be modified. Modifying the operation of the feature or function of the gaming system can inhibit the gaming system from being used in an unauthorized commercial mode.

For example, modifying the operation of the feature or function of the gaming system can comprise restricting available paytables electronic games executed by the gaming system. Additionally, or alternatively, modifying the operation of the feature or function of the gaming system can comprise disabling an accounting function of the gaming system. Modifying the operation of the feature or function of the gaming system can additionally, or alternatively, comprise modifying a cashout function of the gaming system to pay out an amount different from an amount of a credit meter of the gaming system. Additionally, or alternatively, modifying the operation of the feature or function of the gaming system can comprise crediting a credit meter of the gaming system for an amount greater than an award amount of an electronic game executed by the gaming system. In some cases, modifying the operation of the feature or function of the gaming system can additionally, or alternatively, comprise decrementing a credit meter of the gaming system an amount greater than a wager placed in an electronic game executed by the gaming system. Additionally, or alternatively, modifying the operation of the feature or function of the gaming system can comprise requiring a player of an electronic game to provide a pre-defined input which initiates a selection function of the non-commercial mode.

According to another embodiment, a gaming system can comprise a processor and a memory coupled with and readable by the processor. The memory can store therein a set of instructions which, when executed by the processor, causes the processor to initiate a start-up routine and read, during the start-up routine, a pre-defined value stored in the memory of the gaming system. The pre-defined value can indicate a market in which the gaming system is to be operated. The market can comprise one of a plurality of possible markets and the plurality of markets can comprise a commercial market and a non-commercial market. A determination can be made to operate the gaming system in a commercial mode or a non-commercial mode based on the pre-defined value. In response to determining to operate the gaming system in the non-commercial mode, operation of a feature or function of the gaming system can be modified. Modifying the operation of the feature of function of the gaming system can inhibit the gaming system from being used in an unauthorized commercial mode.

For example, the gaming system can further comprise a money handling device. In such cases, modifying the operation of the feature or function of the gaming system can comprise disabling the money handling device. Additionally, or alternatively, modifying the operation of the feature or function of the gaming system can comprise resetting a configuration of the gaming system. In some cases, modifying the operation of the feature or function of the gaming system can additionally, or alternatively, comprise powering down the gaming system based on time. Additionally, or alternatively, modifying the operation of the feature or function of the gaming system can comprise disabling an output device of the gaming system and/or changing operation of an output device of the gaming system. Modifying the operation of the feature or function of the gaming system can additionally, or alternatively, comprise introducing latency into functions of the gaming system.

According to yet another embodiment, a non-transitory, computer-readable medium can comprise a set of instructions stored therein which, when executed by a processor, causes the processor to initiate a start-up routine and read, during the start-up routine, a pre-defined value stored in a memory of a gaming system. The pre-defined value can indicate a market in which the gaming system is to be operated. The market can comprise one of a plurality of possible markets and the plurality of markets can comprise a commercial market and a non-commercial market. A determination can be made to operate the gaming system in a commercial mode or a non-commercial mode based on the pre-defined value. In response to determining to operate the gaming system in the non-commercial mode, operation of a feature or function of the gaming system can be modified. Modifying the operation of the feature of function of the gaming system can inhibit the gaming system from being used in an unauthorized commercial mode.

For example, modifying the operation of the feature or function of the gaming system can comprise introducing a delay between electronic games executed by the gaming system. Additionally, or alternatively, modifying the operation of the feature or function of the gaming system can comprise displaying additional information on a user interface of an electronic game executed by the gaming system. Modifying the operation of the feature or function of the gaming system can additionally, or alternatively, comprise one or more of initiating a game selection process, initiating a selection function of the non-commercial mode in response to a player input during an electronic game executed by the gaming system, and/or disabling a function of the gaming system required by law or regulation.

Additional features and advantages are described herein and will be apparent from the following Description and the figures.

DETAILED DESCRIPTION

Embodiments of the present disclosure are directed to controlling access to a gaming system and, more specifically, controlling access to a mode of operation of the gaming system in a manner it is not intended. More specifically, embodiments are directed to controlling use of the gaming system in a "show" mode, which is named for the "gaming show", or "gaming convention" where customers typically travel to a convention to view and demo gaming products, such as the Global Gaming Expo held in Las Vegas every year. When in the "show" mode, the gaming system and software it executes are configured to be friendly to a show environment. In the show environment, ease of configuration and demonstration is key such that sales and other employees can quickly install and demonstrate software to potential customers.

In some cases, users of such gaming systems have been able to use this show mode in a release environment, i.e., in a commercial manner to allow live gaming and gambling, bypassing the purchasing of the software from the gaming system producer and skipping regulatory approvals. Embodiments described herein are directed to detecting when the gaming system is in a show mode, i.e., a non-commercial mode as referred to herein, and modifying features and/or functions of the gaming system to inhibit its use in an unintended and/or unauthorized commercial manner, i.e., in a gambling environment. As will be described herein, the features or functions modified can be changed in such a way to make the gaming system inconvenient or even impractical to use in such an unauthorized manner but while still allowing the gaming system to be useful in a show or demonstration.

As used herein, the terms commercial market and commercial mode are used to refer to the gaming mode of operation of the gaming system. In this market and mode, an operator of the gaming system generates revenue from the gaming system based on players gambling on an electronic game executed by the gaming system. Conversely, the terms non-commercial market and non-commercial mode are used to refer to the show mode of the gaming system. In this market and mode, the operator of the gaming system, usually the maker of the gaming system, is providing a demonstration of features of the gaming system. While this may be commercial in nature, i.e., the operator is intending to sell or license the gaming system, revenue is not generated from players gambling on the electronic games executed thereon during the demonstration.

Figure 1:
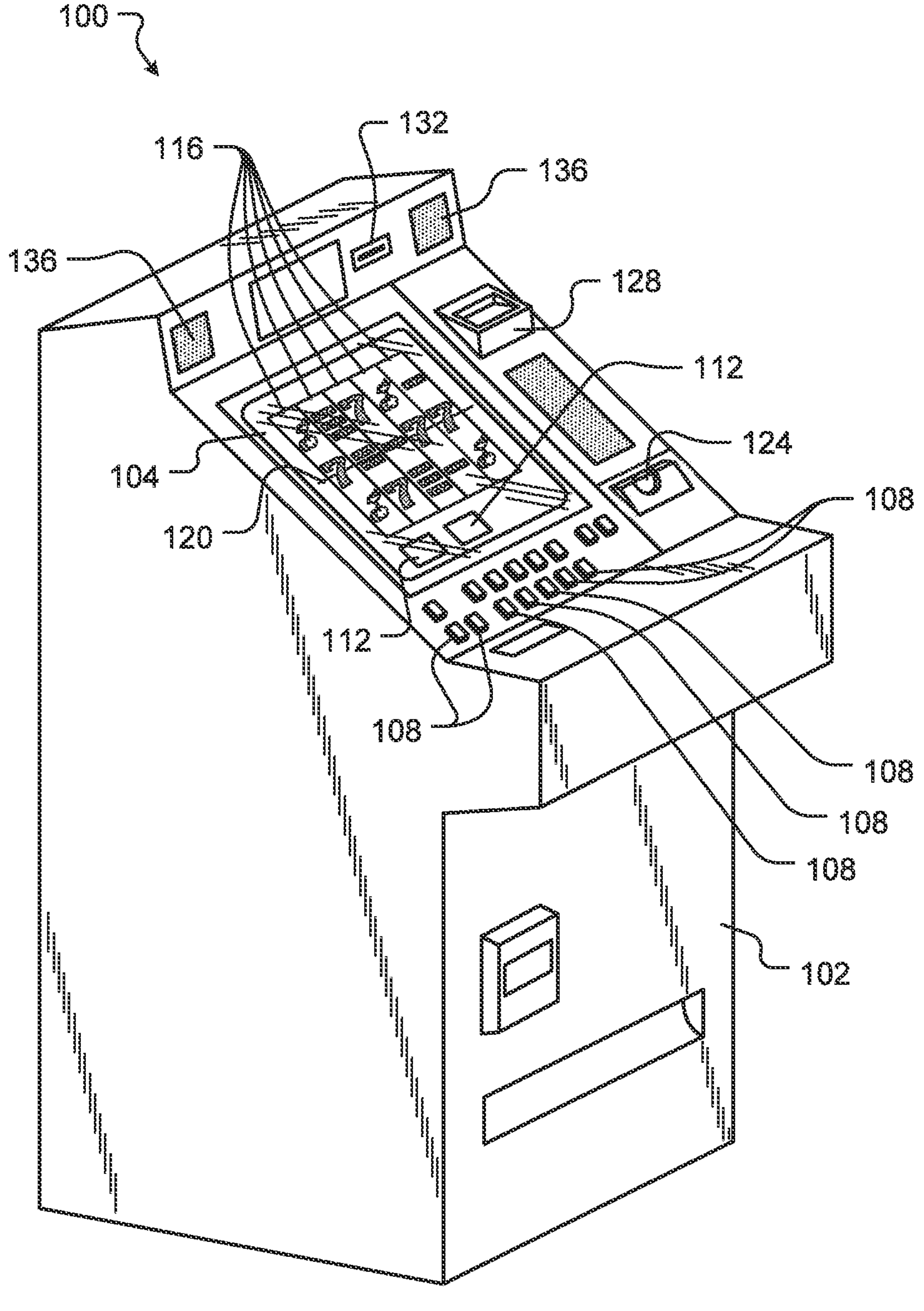
FIG. 1 is a diagram illustrating an exemplary gaming system in which embodiments of the present disclosure may be implemented.

FIG. 1 is a diagram illustrating an exemplary gaming system in which embodiments of the present disclosure may be implemented. More specifically, FIG. 1 illustrates a gaming system 100 that may be used to implement a hold and re-spin game or the like in which a game storyline may be implemented. A gaming system 100 may include a portable or non-portable device used for executing a gaming application or multiple different gaming applications without departing from the scope of the present disclosure. Non-limiting examples of a gaming system can include, but are not limited to, an Electronic Gaming Machine (EGM), a Video Gaming Machine (VGM), a Video Lottery Terminal (VLT), an Electronic Table Game (ETG), a kiosk, a mobile communication device (e.g., a smartphone, laptop, tablet, wearable device, etc.), a personal computer (PC), etc. An EGM or VGM-type of gaming system 100 is shown in FIG. 1 in accordance with embodiments of the present disclosure.

The illustrative gaming system 100 of FIG. 1 is shown to include a support structure, housing or cabinet 102 which provides support for a plurality of displays, inputs, controls and other features of a conventional gaming machine. In the illustrated embodiment, a player can play the gaming system 100 while sitting. However, the gaming system 100 can be alternatively configured so that a player can operate it while standing or sitting. The illustrated gaming system 100 can be positioned on the floor but can be positioned alternatively (i) on a base or stand, (ii) as a pub-style table-top game, (iii) as a stand-alone gaming system on the floor of a casino with other stand-alone gaming system, or (iv) in any other suitable manner. The gaming system 100 can be constructed with varying cabinet and display configurations.

In one embodiment, a gaming system 100 can be configured to randomly generate awards and/or other game outcomes based on probability data. Since a gaming system 100 can generate outcomes randomly or based upon a probability calculation, there is no certainty that the gaming system 100 will provide the player with any specific award or other game outcome.

In some embodiments, a gaming system 100 may employ a predetermined or finite set or pool of awards, progressive awards, prizes or other game outcomes. In such an embodiment, as each award or other game outcome is provided to the player, the gaming system 100 removes the provided award or other game outcome from the predetermined set or pool. Once removed from the set or pool, the specific provided award or other game outcome cannot be provided to the player again. The gaming system 100 may provide players with some or all of the available awards or other game outcomes over the course of a play cycle and may or may not guarantee a designated number of actual wins and losses.

The gaming system 100 may include one or more displays 112. An illustrative display 112 may include a credit display that displays a player's current number of credits, cash, account balance or the equivalent. Another illustrative display 112 may include a bet display that displays a player's amount wagered.

The gaming system 100 is also shown to include at least one payment acceptor. Illustrative payment acceptors may include, without limitation, a coin slot 124, where the player inserts coins or tokens, and a ticket, note, or bill acceptor 128, where the player inserts a bar-coded ticket, note, or cash. In one embodiment, a player-tracking card, credit card, debit card, or data card reader/validator 132 is also provided for accepting any of those or other types of cards as a form of payment toward playing a game on the gaming system 100.

In one embodiment, a player inserts an identification card into card reader 132 of gaming system 100. The identification card can be a smart card having a programmed microchip or a magnetic strip coded with a player's identification, credit totals, and other relevant information. In one embodiment, money may be transferred to a credit meter of the gaming system 100 through an electronic fund transfer and card reader 132 using the player's credit, debit, or smart card. When a player funds the gaming system 100, a processor of the gaming system 100 may determine the amount of funds entered and the corresponding amount is shown on the credit or other suitable display 112 as described herein.

In one embodiment, after appropriate funding of gaming system 100, the player presses an input device 108 to initiate game play. The input devices 108 may include various types of buttons, levers, gesture inputs, cameras, etc., that enable a player to start any game play or sequence of events. In one embodiment, upon appropriate funding, gaming system 100 begins game play automatically. In another embodiment, the player may be required to actuate or activate one of the play buttons to initiate play of gaming system 100. Other non-limiting types of input devices 108 may include a "bet one" button, a "max bet" button, or any other type of button known to be included in an EGM, VGM, or the like. It should further be appreciated that the input devices 108 may correspond to a physical button, a virtual button on a touch-screen of a game, an input element on a Graphical User Interface (GUI), or a combination thereof. In other words, the input devices 108 do not need to correspond to a physical button. In some embodiments, the player places a bet by pushing a "bet one" button (e.g., betting an amount equal to one credit for the next play). The player may increase the player's wager by one credit each time the player pushes "bet one" button. When the player pushes the "bet one" button, the number of credits shown in the credit display decreases by one, and the number of credits shown in the bet display increases by one. A "max bet" button can also be provided, which enables the player to bet the maximum wager (e.g., max lines, max wager per line, and re-spin operation). The gaming system 100 may include other suitable wager buttons, such as a "repeat bet" button (e.g., repeating the bet made from the immediately last play of the gaming system 100 for the next play of the gaming system 100), one or more "select paylines" buttons, a "select re-spin operation" button, and one or more "select wager per payline" buttons.

Another type of input device 108 that may be provided on the gaming system 100 is a physical cash out button, a virtual cash out button, a selectable GUI element, or the like. The player presses a cash out button and cashes-out to receive a cash payment or other suitable form of payment corresponding to the number of remaining credits. The player can receive coins or tokens in a coin payout tray or a ticket or credit slip, which are redeemable by a cashier or funded to the player's electronically-recordable identification card.

The gaming system 100 may also include one or more display screens 104 and one or more sound generating devices 136. The combination of outputs provided on a display screen 104 and sound generating device 136 may contribute to the game play experience and, in some embodiments, may provide the player with information regarding a status of a game play event or sequence of events.

In one embodiment, the sound generating device 136 may include at least one speaker or other type of transducer for generating audible sounds, playing music, etc. In one embodiment, a gaming system 100 can provide dynamic sounds coupled with attractive multimedia images displayed on the display screen 104 to provide an audio-visual representation or to otherwise display full-motion video with sound to attract players to the gaming system 100. During idle periods, the gaming system 100 displays a sequence of audio and/or visual attraction messages to attract potential players to the gaming system 100.

In one embodiment, a base or primary game can include a slot game with one or more paylines 120. As will be discussed in further detail herein, the game provided by the gaming system 100 may support one or multiple paylines 120, which may extend across the display screen 104 vertically, horizontally, diagonally, at adjusted angles, etc. In some embodiments, such as for a slot game, a payline 120 intersects a plurality of reels 116, such as three to five reels. Each reel 116 may be used to display different sets of symbols in connection with game play activity provided by the gaming system 100. In some embodiments, each reel 116 may operate independent of all other reels and the symbols displayed by a reel 116 at the end of a given spin may depend upon random numbers generated by the gaming system 100. The positions of symbols on each reel 116 and in the combination of reels 116 may form the array of symbols distributed throughout an array of cells. The distribution of symbols may be presented in a presentation order rendered to the display screen 104 of the gaming system 100.

The reels 116 may be provided in video form with simulated reels being displayed via the display screen 104. A reel 116 may be used to display any number of symbols such as bells, hearts, fruits, numbers, letters, bars or other images and symbols, which could correspond to a theme associated with a game provided by the gaming system 100. The gaming system 100 may be configured to award prizes, awards, or other game play opportunities when the reels 116 stop spinning and a particular symbol combination is intersected by an active payline 120 (e.g., a payline 120 that is currently being wagered and is subject to evaluation for a win after the reels 116 have stopped spinning and a distribution of symbols is finalized).

As introduced above, embodiments of the present disclosure are directed to controlling access to a gaming system and, more specifically, controlling access to a mode of operation of the gaming system in a manner it is not intended. More specifically, embodiments are directed to controlling use of the gaming system in a "show" mode, which is named for the "gaming show", or "gaming convention" where customers typically travel to a convention to view and demo gaming products, such as the Global Gaming Expo held in Las Vegas every year. When in the "show" mode, the gaming system and software it executes are configured to be friendly to a show environment. In the show environment, ease of configuration and demonstration is key such that sales and other employees can quickly install and demonstrate software to potential customers.

Currently, configuring the gaming system 100 in the "show" mode means skipping some time-consuming steps such as licensing, monetary limits, etc. It also means enabling features for the show, such as the ability for the user, i.e., the player to add money or credits to the machine or to trigger certain game features. These abilities to add credits or trigger game features are sometimes called Show "Gaffs". In the "show" mode, the gaming system 100 may also allow the physical or virtual on-screen cashout button to trigger the on-screen menu for "Gaffing". The menu can allow the user/player to add credits to the gaming system 100 or trigger wins which are acceptable in a show environment but not in a real casino.

In a release environment, the gaming system 100 and software thereof must be licensed by the customer. This can involve using a license USB dongle or a host system to license the gaming system 100 and software. Without the licenses, the gaming system 100 will not allow the user to install or use the software, such as not allowing the user to enable a game which a license cannot be obtained for. In the show mode, this licensing feature is disabled.

Some customers have learned that if they install the show mode software with released software, they can bypass the need to purchase licenses for the gaming system 100 and effectively can install any software for free. Additionally, the operators of such unauthorized gaming systems also likely make other changes to the show mode operations such as bypassing the show "Gaff," e.g., by disabling the physical cashout button so that the player cannot simply add credits to the gaming system 100 which would making the gaming system 100 useless in the casino environment. They may also disable a virtual cashout button by disabling touches on the touchscreen in which that button is displayed in some electronic manner, or by covering the touchscreen with some sort of physical obstruction, such as plastic, wood, tape, etc.

Embodiments of the present disclosure are directed to removing the motivation of the operator and the potential player from using a show mode with released software in an unintended and unauthorized commercial manner. Generally speaking, this can be accomplished by changing operations of various functions or features of the gaming system 100 to eliminate the ability of the machine to generate revenue for the operator.

For example, when the gaming system 100 detects it is in a non-commercial mode, i.e., a show mode, in can do one or more of: only allows paytables that pay more than 100% to be selected when the show mode is detected, disable money-in, e.g., a bill validator, coin acceptor, WAT-in or electronic funds transfers onto the gaming system 100 of cashable and/or promotional credits, disable devices or features of money-out, e.g., a ticket printer, WAT-out or electronic funds transfers off the gaming system 100.

In some cases, the gaming system 100 can be modified to not record the accounting of the gaming system 100 such that the gaming system 100 reports no monetary activity to host system. For example, meters reported to the host system for financial transactions will not increment based upon putting funds on the gaming system 100 and/or playing games and/or transferring funds off the gaming system 100.

In another example, functions of the gaming system 100 can be modified to cash out more than the credit balance to make the credit balance unreliable. For example, when the player cashes out, the gaming system 100 could dispense twice the balance on the gaming system's 100 credit meter. Conversely, the gaming system 100 could cashout less than the credit balance displayed on the gaming system 100.

In some cases, the credit meter balance of the gaming system 100 can be credited for more than the game award. The gaming system 100 could take wins from the game and, for example, add twice the game win to the credit meter balance.

Additionally, or alternatively, the gaming system 100 could charge double the wager. For example, if the player wagers $1, the gaming system 100 could remove $2 from the player's credit balance, but the only award game outcomes based upon the originally selected $1 wager.

The gaming system 100 could be modified to require the "gaff" button to be pressed or used from time to time. For example, the gaming system 100 could require the gaff button and menu to be accessed to switch games or every 10 minutes. If the gaff menu is accessed, the player could simply add credits from the menu.

Modifying the functions or features of the gaming system 100 can additionally, or alternatively, comprise adding delays to the flow. For example, the gaming system 100 could add a delay in between games or while switching games, add instructions or sales information explaining new features or key features, add advertisements. For example, the gaming system 100 could display ads for the company, game, property, etc. every 10 minutes or every 30 game plays. Similarly, a watermark can be added on the screen that overlays the game content.

Additionally, or alternatively, the gaming system 100 could require the player to visit a "chooser." A chooser is software used by the player to select which game to play when the gaming system 100 provides more than one electronic game. In the show environment it is not likely that somebody plays more than a few consecutive games, so the gaming system 100 could force the player to visit the chooser after a pre-defined number of consecutive games. For example, the gaming system 100 could switch the player to the chooser every 50 games and ask them to pick another game. In another embodiment, the game just played could no longer be available for selection until the player wagers for a number of additional game cycles on another game.

Adding the "Gaff" menu functionality to the spin button or touch screen such that the operator cannot physically disable the button that triggers the Gaff functionality. In another embodiment, the "Gaff" menu functionality could be accessed through player interaction with one or more buttons or UI touchpoints of the EGM. For example, the player can access the "Gaff" menu by holding down the max bet button while touching the top left corner of the screen for 10 seconds.

Additionally, or alternatively, the gaming system 100 could be modified to disable certain features that may be required by a jurisdiction, such as the ability for the gaming system 100 to remotely disabled or perform GAT validation of software on the gaming system 100, e.g., challenge the gaming system 100 for the CRC of its operating system image, or the software on the bill validator connected to the gaming system 100.

In some cases, the gaming system 100 could additionally, or alternatively, reset certain configurations after a certain period of time, automatically. For example, the gaming system 100 may set the volume to the loudest level every 12 hours, or change the jackpot limit to the maximum value every 12 hours, etc.

Gaming shows or customer demos usually do not operate past working hours. Accordingly, in some embodiments, the gaming system 100 could be modified to automatically turn itself off a certain number of hours, e.g., eight hours, after starting up or after a certain time of day, e.g., 6 pm local time.

The gaming system 100 candle is typically used as an indicator that a player needs help, e.g., a jackpot, etc. When in show mode, the candle of the gaming system 100 could constantly flash indicating the player won a jackpot. In another embodiment, the function of the candle could be modified to never flash under any condition.

Additionally, or alternatively, functions of the gaming system 100 could be modified to give the appearance that certain hardware has malfunctioned or gone "haywire" after the gaming system 100 is in show mode too long. For example, the gaming system's 100 speakers could play a fire alarm sound 8 hours after starting. In another example, the gaming system's 100 bell could ring 8 hours after starting.

In yet another example, gaming system 100 performance could be degraded after a certain period of time has elapsed since the gaming system 100 started and an indicator of such performance degradation could optionally be displayed. For example, the gaming system 100 could go from rendering the game at 60 frames per second under normal operating conditions to rendering the game at 5 frames per second during "slowdown" mode.

Figure 2:
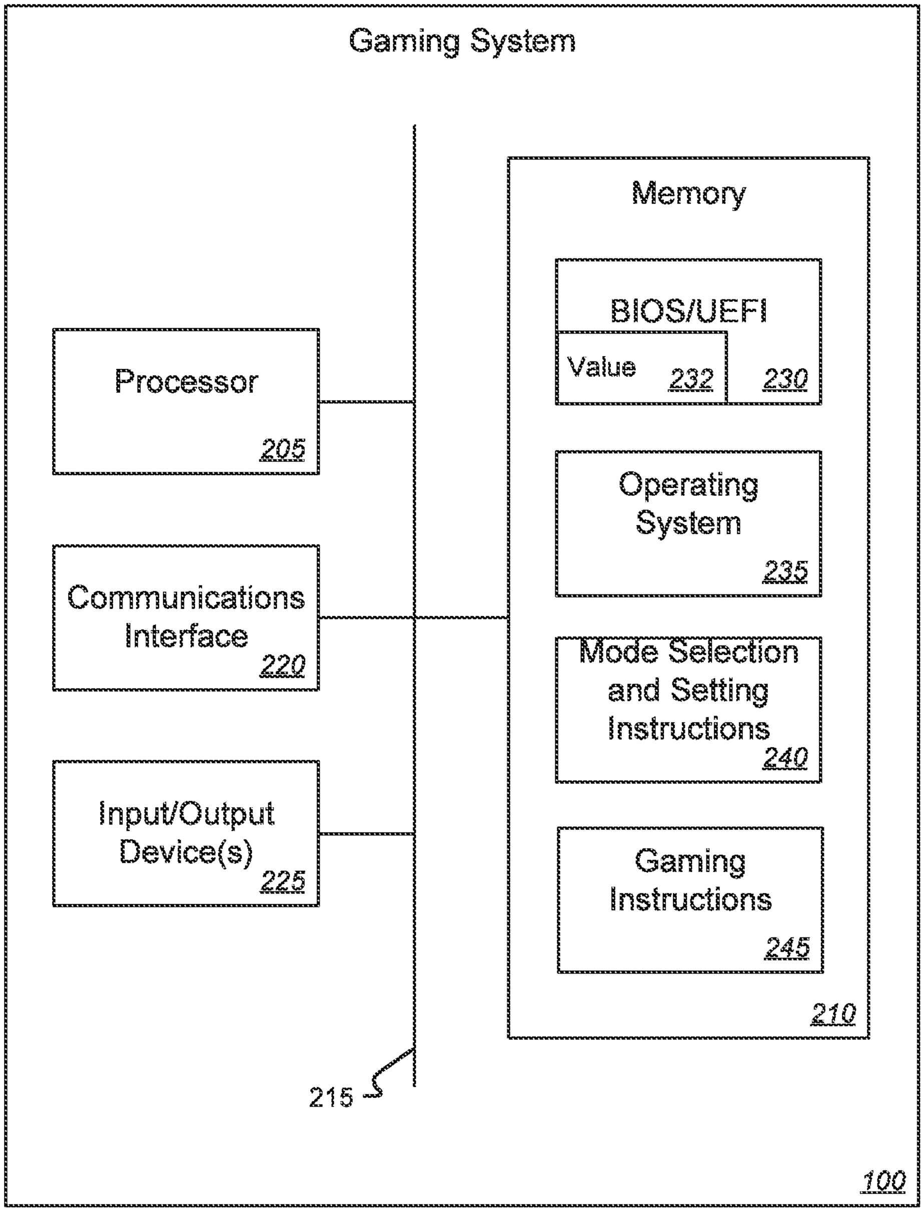
FIG. 2 is a block diagram illustrating additional details of an exemplary gaming system in which unique storylines can be implemented according to embodiments of the present disclosure.

FIG. 2 is a block diagram illustrating additional details of an exemplary gaming system in which unique storylines can be implemented according to embodiments of the present disclosure. As illustrated in this example, the gaming system 100 can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 210. Upon executing the instruction sets stored in memory 210, the processor 205 enables various functions of the gaming system 100 as described herein.

The memory 210 can be coupled with and readable by the processor 205 via a communications bus 215. The memory 210 may include any type of computer memory device or collection of computer memory devices. Non-limiting examples of memory 210 include Random Access Memory (RAM), Read Only Memory (ROM), flash memory, Electronically-Erasable Programmable ROM (EEPROM), Dynamic RAM (DRAM), etc. The memory 210 may be configured to store the instruction sets depicted in addition to temporarily storing data for the processor 205 to execute various types of routines or functions.

The processor 205 can also be coupled with one or more communications interfaces 220 and one or more input/output devices 225 via the bus 215. The communication interfaces 220 can comprise, for example, Ethernet, Bluetooth, WiFi, or other type of wired or wireless communications interfaces. The input/output devices 225 can comprise, for example, a display such as a Liquid Crystal Display (LCD), Light Emitting Diode (LED), Organic Light Emitting Diode (OLED), display or other type of display for presenting images and other graphics and can be touch sensitive allowing the user to use the display as an input device as well. Additionally, or alternatively, the input/output devices 225 can comprise any combination of reels, buttons, lights, and/or other input/output devices.

The memory 210 can store therein a set of BIOS/UEFI instructions 230 and operating system instructions 235. Generally speaking, and as known in the art, upon power being allied to the gaming system 100, the BIOS/UEFI instructions 230 and operating system instructions 235 can be executed by the processor 205 to start up and initialize basic operations of the gaming system 100. According to one embodiment, a predefined value 232 indicating a market in which the gaming system 100 is operated can be stored in the BIOS/UEFI instruction 230, operating system instructions 235, or elsewhere in memory 210. Generally speaking, this predefined value 232 can be used to control access to the gaming system.

That is, as known in the art, the processor 205 can execute the BIOS/UEFI instructions 230 which cause the processor 205 to configure the hardware in preparation for the operating system instructions 235. The value 232 of the market indicator can indicate a market such as "Nevada" or "Europe". The configuration(s) and behaviors of the gaming system 100 can be set as appropriate to that market.

As noted, the value 232 of the market indicator could be stored elsewhere in memory 210 separate from the BIOS/UEFI instructions 230 or even in different storage device (not shown here). For example, the value 232 of the market indicator could be read from a file on a USB thumb drive inserted into the gaming system 100 or loaded into the gaming system 100 via a USB thumb drive during initial setup, etc. Changing that device, or the file loaded from that device, would also change the market behavior.

More specifically, the memory can also have stored therein a set of mode selection and setting instructions 240 which, when executed by the processor 205, cause the processor 205 to read, during the start-up routine, the pre-defined value 232 stored in the memory 205 of the gaming system 100. The pre-defined value 232 can indicate a market in which the gaming system 100 is to be operated. The market can comprise one of a plurality of possible markets and the plurality of markets can comprise a commercial market and a non-commercial market such as a show environment, for example. The mode selection and setting instructions 240 can further cause the processor 205 to make a determination as to whether to operate the gaming system 100 in a commercial mode or a non-commercial mode based on the pre-defined value. In response to determining to operate in the commercial mode, a set of gaming instructions 245 stored in the memory can be executed by the processor 205 in the commercial mode causing the processor 205 to provide an electronic game with features and functions of the gaming system 100 unmodified.

In response to determining 415 to operate the gaming system 100 in the non-commercial mode, the mode selection and setting instructions 240 can further cause the processor 205 to modify operation of one or more features or functions of the gaming system 100. Modifying 425 the operation of the feature(s) or function(s) of the gaming system 100 can inhibit the gaming system 100 from being used in an unauthorized commercial mode in various ways as described herein. The gaming instructions 245 can then cause the processor 205 to provide the electronic game but with the modified features or functions of the gaming system 100.

Figure 3:
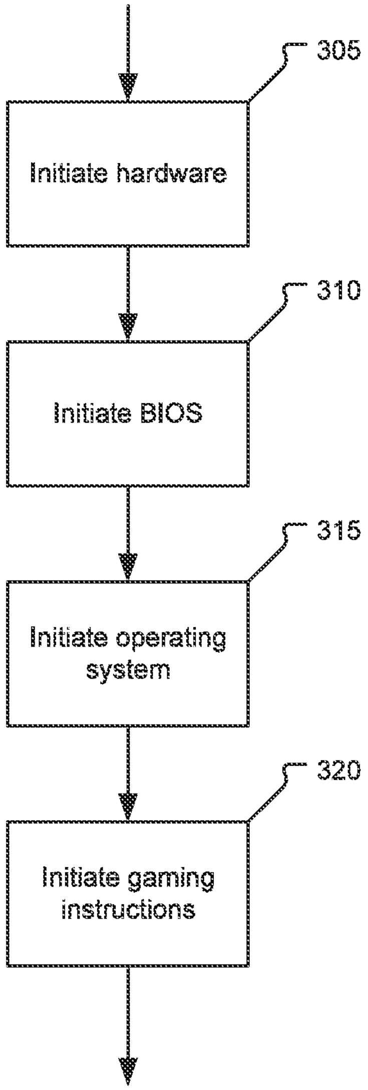
FIG. 3 is a flowchart illustrating an exemplary start-up routine for a gaming system according to one embodiment of the present disclosure.

FIG. 3 is a flowchart illustrating an exemplary start-up routine for a gaming system according to one embodiment of the present disclosure. As illustrated in this example, the process can begin with initiating 305 the hardware of the gaming system 100, e.g., upon powering up the gaming system 100, as known in the art. As the hardware of the gaming system 100 is initiated, the BIOS of the gaming system 100 can also be initiated 310. According to one embodiment, the BIOS can have stored therein an indicator having a predefined value. The value can indicate a market in which the gaming system 100 is operated. As noted, this value may alternatively be stored elsewhere in the memory of the gaming system 100. The initiation process can continue with initiating an operating system of the gaming system 100 and initiating execution of the gaming instructions.

Figure 4:
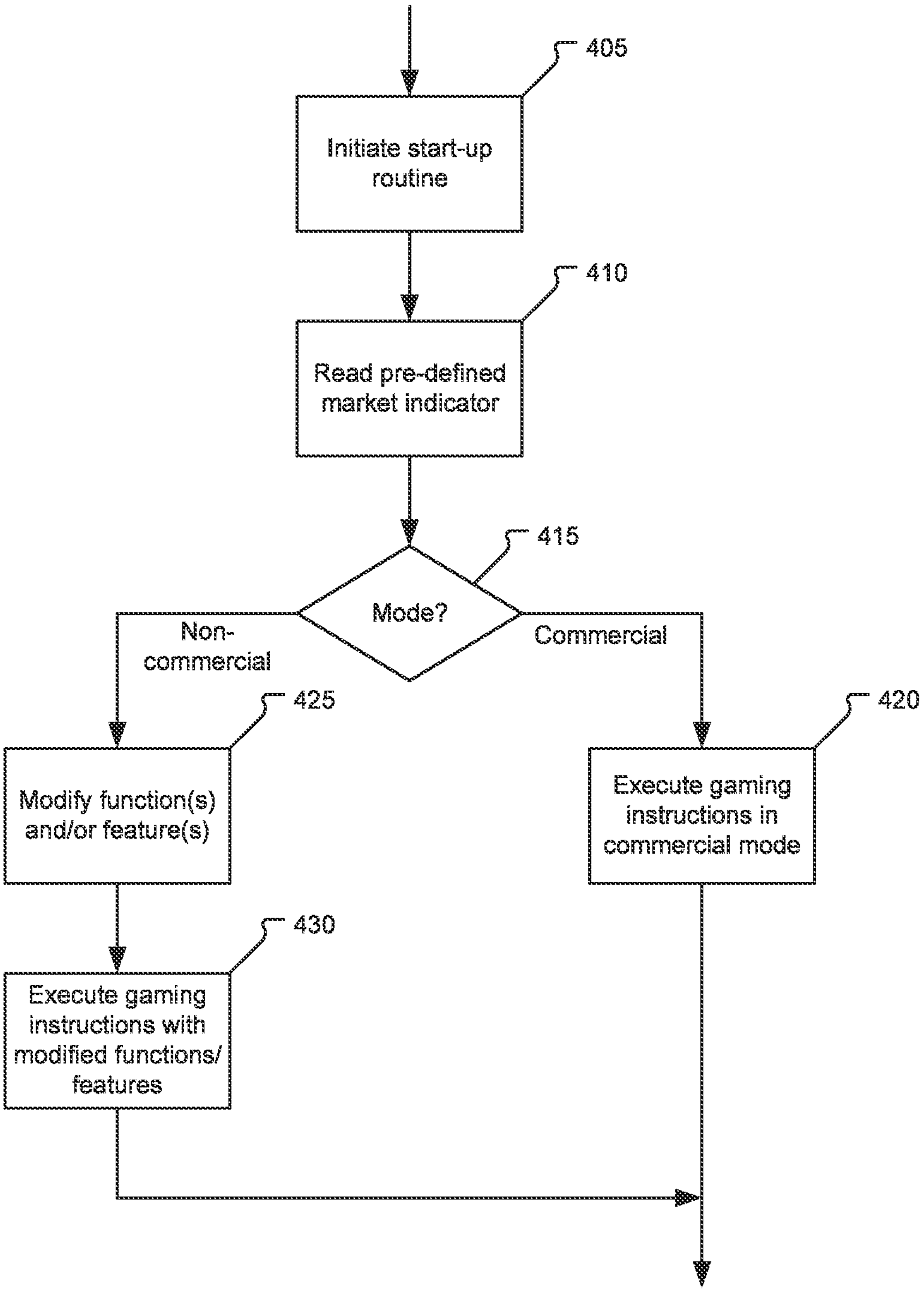
FIG. 4 is a flowchart illustrating an exemplary process for controlling access to a gaming system according to one embodiment of the present disclosure.

FIG. 4 is a flowchart illustrating an exemplary process for controlling access to a gaming system according to one embodiment of the present disclosure. As illustrated in this example, controlling access to a gaming system 100 can comprise initiating 405 a start-up routine such as described above and reading 410, during the start-up routine, a pre-defined value indicating a market in which the gaming system 100 is to be operated. Reading 410 the value can comprise any of reading a value from a USB drive, detecting or not detecting a button press during the boot process for the gaming system 100, receiving or not receiving a password or key code into the gaming system 100, receiving or not receiving information from a host machine, and/or others. The market can comprise one of a plurality of possible markets and the plurality of markets can comprise a commercial market and a non-commercial market such as a show environment, for example. A determination 415 can be made as to operate the gaming system 100 in a commercial mode or a non-commercial mode based on the pre-defined value. In response to determining 415 to operate in the commercial mode, the gaming instructions of the gaming system 100 can executed 420 in the commercial mode with features and functions of the gaming system 100 unmodified.

In response to determining 415 to operate the gaming system 100 in the non-commercial mode operation of one or more features or functions of the gaming system 100 can be modified 425 and the gaming instructions can be executed 430 with the modified features or functions. Modifying 425 the operation of the feature(s) or function(s) of the gaming system 100 can inhibit the gaming system 100 from being used in an unauthorized commercial mode.

For example, modifying 425 the operation of the feature or function of the gaming system 100 can comprise restricting available paytables of electronic games executed by the gaming system 100. Additionally, or alternatively, modifying 425 the operation of the feature or function of the gaming system 100 can comprise disabling an accounting function of the gaming system 100. Modifying 425 the operation of the feature or function of the gaming system 100 can additionally, or alternatively, comprise modifying a cashout function of the gaming system 100 to pay out an amount different from an amount of a credit meter of the gaming system 100. Additionally, or alternatively, modifying 425 the operation of the feature or function of the gaming system 100 can comprise crediting a credit meter of the gaming system 100 for an amount greater than an award amount of an electronic game executed by the gaming system 100. In some cases, modifying 425 the operation of the feature or function of the gaming system 100 can additionally, or alternatively, comprise decrementing a credit meter of the gaming system 100 an amount greater than a wager placed in an electronic game executed by the gaming system 100. Additionally, or alternatively, modifying 425 the operation of the feature or function of the gaming system 100 can comprise requiring a player of an electronic game to provide a pre-defined input which initiates a selection function of the non-commercial mode.

In some cases, the gaming system 100 can further comprise a money handling device. In such cases, modifying 425 the operation of the feature or function of the gaming system 100 can comprise disabling the money handling device. Additionally, or alternatively, modifying 425 the operation of the feature or function of the gaming system 100 can comprise resetting a configuration of the gaming system 100, e.g., periodically, at random, at a particular time of day, etc. In some cases, modifying 425 the operation of the feature or function of the gaming system 100 can additionally, or alternatively, comprise powering down the gaming system 100 based on time, e.g., a length of time operating, a time of day, etc. Additionally, or alternatively, modifying 425 the operation of the feature or function of the gaming system 100 can comprise disabling an output device of the gaming system 100 and/or changing operation of an output device of the gaming system 100 such as a display or speaker. Modifying 425 the operation of the feature or function of the gaming system 100 can additionally, or alternatively, comprise introducing latency into functions of the gaming system 100.

In some cases, modifying 425 the operation of the feature or function of the gaming system 100 can comprise introducing a delay between electronic games executed by the gaming system 100. Additionally, or alternatively, modifying 425 the operation of the feature or function of the gaming system 100 can comprise displaying additional information on a user interface of an electronic game executed by the gaming system 100. Modifying 425 the operation of the feature or function of the gaming system 100 can additionally, or alternatively, comprise one or more of initiating a game selection process, initiating a selection function of the non-commercial mode in response to a player input during an electronic game executed by the gaming system 100, and/or disabling a function of the gaming system 100 required by law or regulation.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS). Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method for controlling access to a gaming system, the method comprising:

initiating, by a processor of the gaming system, a start-up routine of the gaming system upon power up of the gaming system, wherein the start-up routine initiates hardware of the gaming system;

reading, by the processor of the gaming system, during the start-up routine, a pre-defined value stored in a memory of the gaming system, the pre-defined value indicating a market in which the gaming system is to be operated, wherein the market comprises one of a plurality of possible markets and wherein the plurality of markets comprises a commercial market and a non-commercial market;

determining, by the processor of the gaming system, during the start-up routine, whether to operate the gaming system in a commercial mode or a non-commercial mode based on the pre-defined value; and in response to determining to operate the gaming system in the non-commercial mode, modifying, by the processor of the gaming system, during the start-up routine, operation of a feature or function of the gaming system, wherein modifying the operation of the feature or function of the gaming system inhibits the gaming system from being used in an unauthorized commercial mode.

2. The method of claim 1, wherein modifying the operation of the feature or function of the gaming system comprises restricting available paytables electronic games executed by the gaming system.

3. The method of claim 1, wherein modifying the operation of the feature or function of the gaming system comprises disabling an accounting function of the gaming system.

4. The method of claim 1, wherein modifying the operation of the feature or function of the gaming system comprises modifying a cashout function of the gaming system to pay out an amount different from an amount of a credit meter of the gaming system.

5. The method of claim 1, wherein modifying the operation of the feature or function of the gaming system comprises crediting a credit meter of the gaming system for an amount greater than an award amount of an electronic game executed by the gaming system.

6. The method of claim 1, wherein modifying the operation of the feature or function of the gaming system comprises decrementing a credit meter of the gaming system an amount greater than a wager placed in an electronic game executed by the gaming system.

7. The method of claim 1, wherein modifying the operation of the feature or function of the gaming system comprises requiring a player of an electronic game to provide a pre-defined input which initiates a selection function of the non-commercial mode.

8. A gaming system comprising:

a processor; and a memory coupled with and readable by the processor and storing therein a set of instructions which, when executed by the processor, causes the processor to:

initiate a start-up routine of the gaming system upon power up of the gaming system, wherein the start-up routine initiates hardware of the gaming system;

read, during the start-up routine, a pre-defined value stored in the memory of the gaming system, the pre-defined value indicating a market in which the gaming system is to be operated, wherein the market comprises one of a plurality of possible markets and wherein the plurality of markets comprises a commercial market and a non-commercial market;

determine, during the start-up routine, whether to operate the gaming system in a commercial mode or a non-commercial mode based on the pre-defined value; and in response to determining to operate the gaming system in the non-commercial mode, modify, during the start-up routine, operation of a feature or function of the gaming system, wherein modifying the operation of the feature or function of the gaming system inhibits the gaming system from being used in an unauthorized commercial mode.

9. The gaming system of claim 8, wherein the gaming system further comprises a money handling device and wherein modifying the operation of the feature or function of the gaming system comprises disabling the money handling device.

10. The gaming system of claim 8, wherein modifying the operation of the feature or function of the gaming system comprises resetting a configuration of the gaming system.

11. The gaming system of claim 8, wherein modifying the operation of the feature or function of the gaming system comprises powering down the gaming system based on time.

12. The gaming system of claim 8, wherein modifying the operation of the feature or function of the gaming system comprises disabling an output device of the gaming system.

13. The gaming system of claim 8, wherein modifying the operation of the feature or function of the gaming system comprises changing operation of an output device of the gaming system.

14. The gaming system of claim 8, wherein modifying the operation of the feature or function of the gaming system comprises introducing latency into functions of the gaming system.

15. A non-transitory, computer-readable medium comprising a set of instructions stored therein which, when executed by a processor, causes the processor to:

initiate a start-up routine of a gaming system upon power up of the gaming system, wherein the start-up routine initiates hardware of the gaming system;

read during the start-up routine, a pre-defined value stored in a memory of the gaming system, the pre-defined value indicating a market in which the gaming system is to be operated, wherein the market comprises one of a plurality of possible markets and wherein the plurality of markets comprises a commercial market and a non-commercial market;

determine, during the start-up routine, whether to operate the gaming system in a commercial mode or a non-commercial mode based on the pre-defined value; and in response to determining to operate the gaming system in the non-commercial mode, modify, during the start-up routine, operation of a feature or function of the gaming system, wherein modifying the operation of the feature or function the gaming system inhibits the gaming system from being used in an unauthorized commercial mode.

16. The non-transitory, computer-readable medium of claim 15, wherein modifying the operation of the feature or function of the gaming system comprises introducing a delay between electronic games executed by the gaming system.

17. The non-transitory, computer-readable medium of claim 15, wherein modifying the operation of the feature or function of the gaming system comprises displaying additional information on a user interface of an electronic game executed by the gaming system.

18. The non-transitory, computer-readable medium of claim 15, wherein modifying the operation of the feature or function of the gaming system comprises initiating a game selection process.

19. The non-transitory, computer-readable medium of claim 15, wherein modifying the operation of the feature or function of the gaming system comprises initiating a selection function of the non-commercial mode in response to a player input during an electronic game executed by the gaming system.

20. The non-transitory, computer-readable medium of claim 15, wherein modifying the operation of the feature or function of the gaming system comprises disabling a function of the gaming system required by law or regulation.

* * * * *